US006358425B1

(12) United States Patent
King

(10) Patent No.: US 6,358,425 B1
(45) Date of Patent: *Mar. 19, 2002

(54) POOL CLEANING AND SANITIZING APPARATUS

(76) Inventor: Joseph A. King, 142 Chevy Chase Dr., Wayzata, MN (US) 55391

( * ) Notice: Subject to any disclaimer, the term of this patent is extended or adjusted under 35 U.S.C. 154(b) by 0 days.

This patent is subject to a terminal disclaimer.

(21) Appl. No.: 09/326,457

(22) Filed: Jun. 7, 1999

Related U.S. Application Data

(63) Continuation-in-part of application No. 09/037,176, filed on May 9, 1998, now Pat. No. 5,976,385.

(51) Int. Cl.[7] .............................. C02F 1/50; E04H 4/16
(52) U.S. Cl. ...................... 210/764; 210/169; 210/206; 210/242.1; 210/416.2; 422/37; 422/265; 422/278; 15/1.7; 137/268
(58) Field of Search ................................. 210/754, 764, 210/169, 198.1, 206, 242.1, 416.2; 422/261, 263, 265, 278, 37; 15/1.7; 137/268

(56) References Cited

U.S. PATENT DOCUMENTS

| 846,100 A | * | 3/1907 | Estep |
| 2,235,278 A | * | 3/1941 | Brunner |
| 3,132,364 A | * | 5/1964 | Oxley |
| 3,947,362 A | * | 3/1976 | Etani |
| 4,188,295 A | * | 2/1980 | Burnett |
| 4,642,833 A | * | 2/1987 | Stolz et al. |
| 4,691,732 A | * | 9/1987 | Johnson et al. |
| 4,780,197 A | * | 10/1988 | Schuman |
| 5,660,802 A | * | 8/1997 | Archer et al. |
| 5,730,178 A | * | 3/1998 | Zhadanov et al. |
| 5,810,999 A | * | 9/1998 | Bachand et al. |
| 5,882,512 A | * | 3/1999 | Denkewicz, Jr. et al. |
| 5,976,385 A | * | 11/1999 | King |
| 6,119,707 A | * | 9/2000 | Jordan |

* cited by examiner

Primary Examiner—David A. Simmons
Assistant Examiner—Fred Prince
(74) Attorney, Agent, or Firm—Jacobson & Johnson

(57) ABSTRACT

A pool apparatus that simultaneously removes debris from the water and purifies water in a portion of the water passing through the pool apparatus with the pool apparatus having an intake head for drawing water and debris from a first region of the pool and directing the water and debris to a housing having a restrictor therein for directing a portion of the water through a water purification material and the remaining portion with the debris therein along an unimpeded path in the housing to a collector where the debris is collected and the water is returned to the pool.

13 Claims, 5 Drawing Sheets

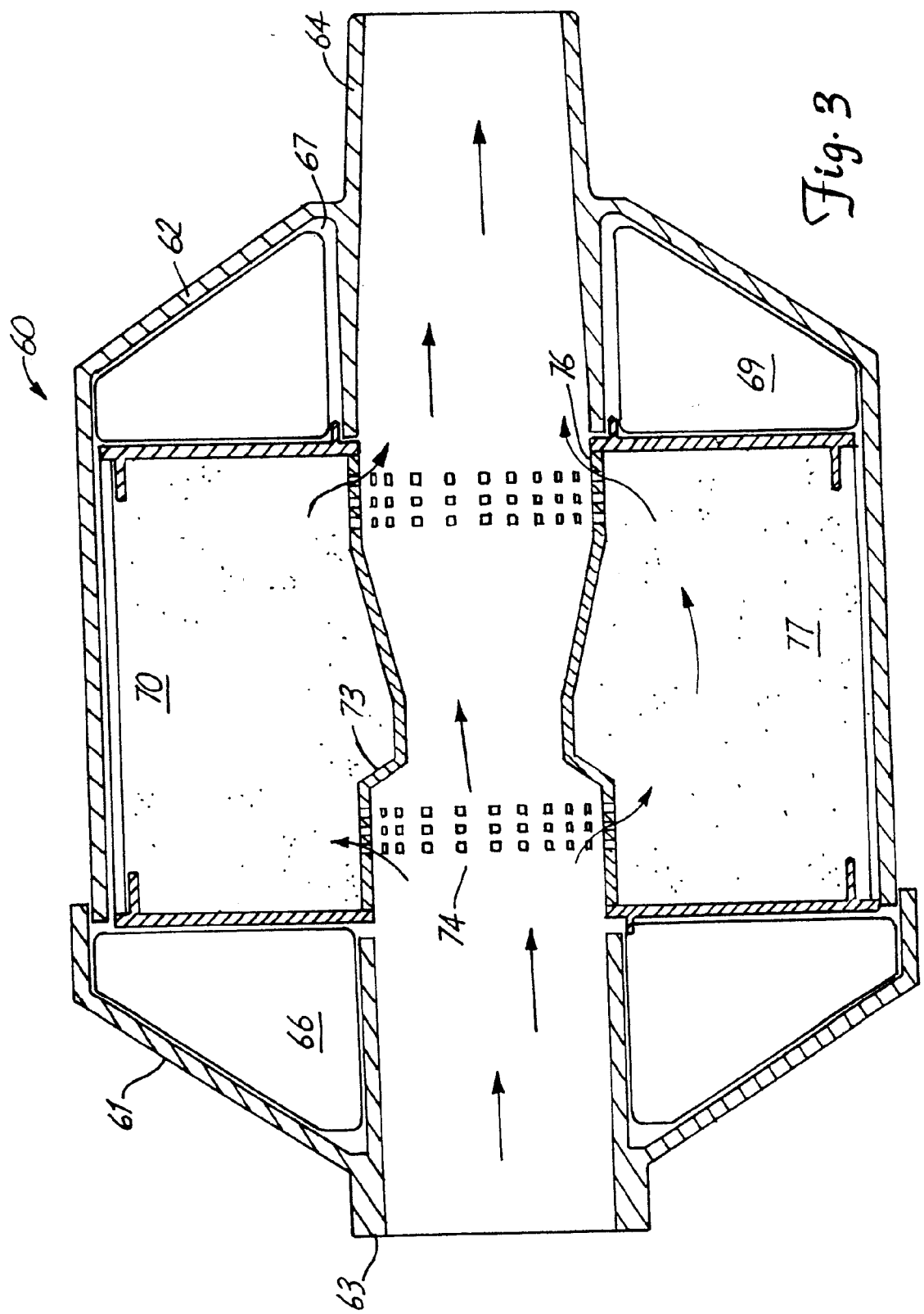

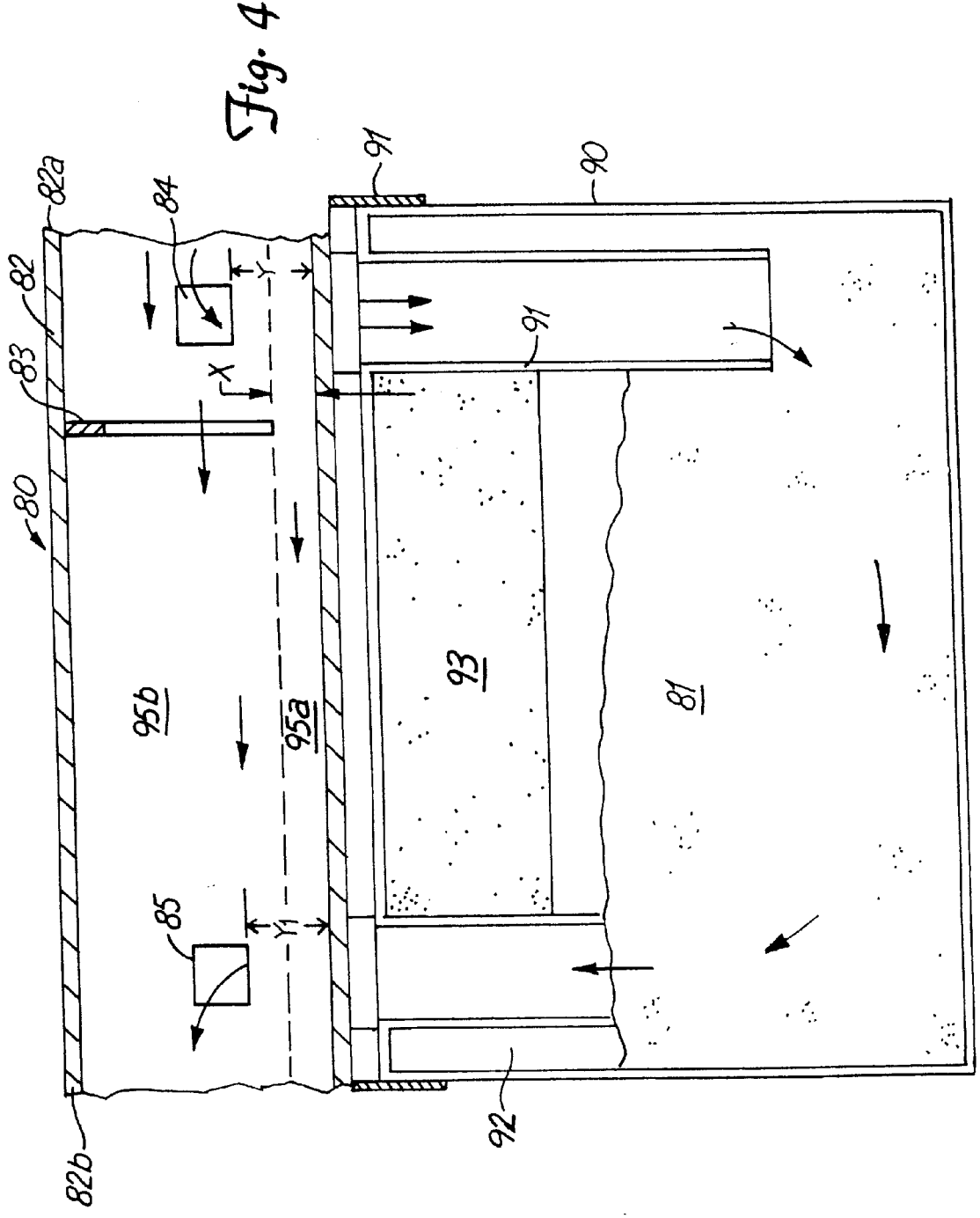

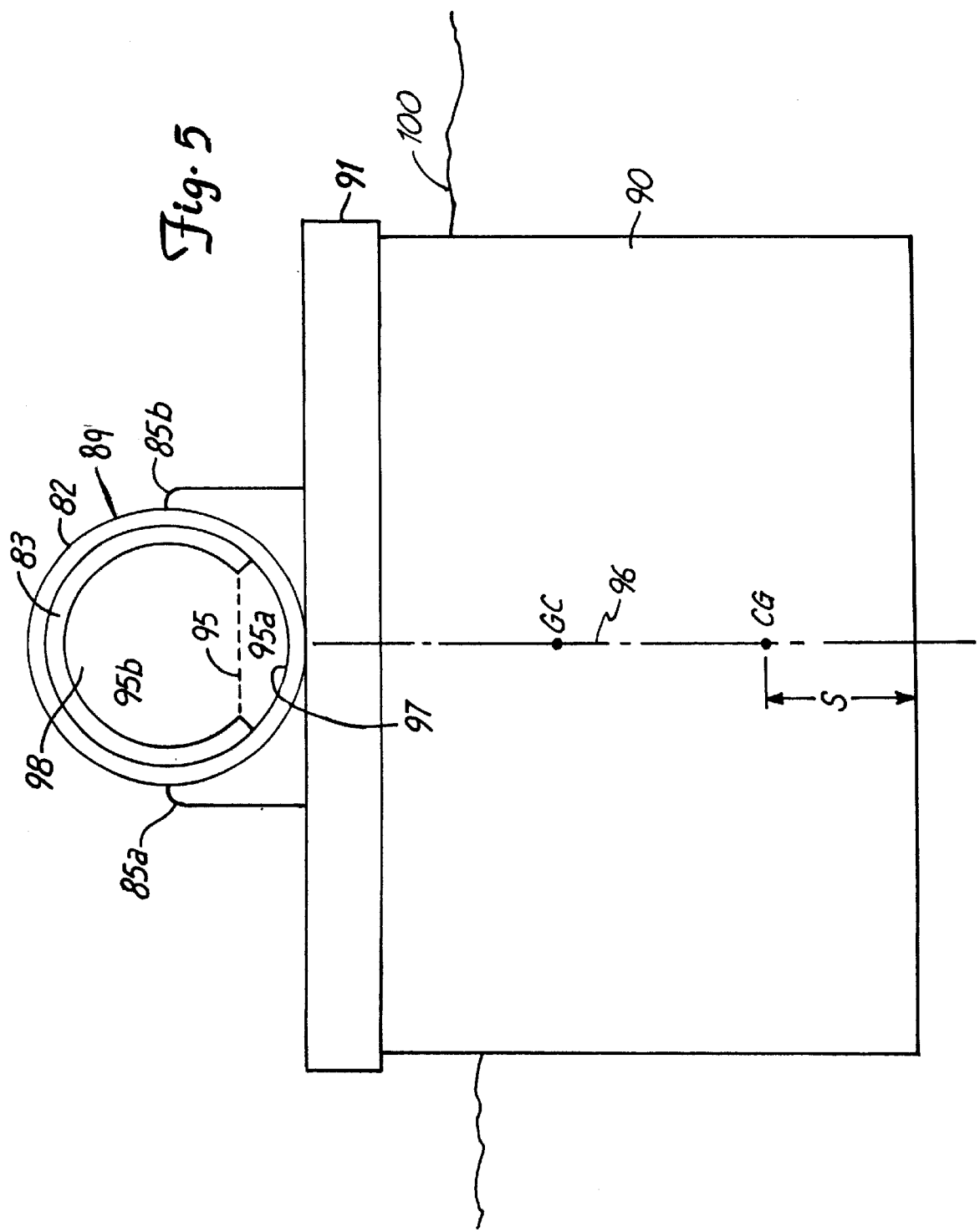

POOL CLEANING AND SANITIZING APPARATUS

CROSS REFERENCE TO RELATED APPLICATIONS

This application is a continuation-in-part of my patent application Ser. No. 09/037,196 now U.S. Pat. No. 5,976,385 filed May 9, 1998 titled Pool Cleaner and Sanitizing Apparatus.

FIELD OF THE INVENTION

This invention relates generally to a pool apparatus and more specifically to a pool apparatus that simultaneously removes debris from the water and purifies the water in a portion of the water passing through the pool apparatus.

BACKGROUND OF THE INVENTION

Pool cleaning systems for removing debris from the bottom of spas and pools are known in the art, as are inline systems for killing bacteria in spas and pools. The two systems operate independently with respect to one another. The pool cleaning system has a mobile suction apparatus for collecting debris that has fallen or blown into the pool. To remove debris from the pool, one moves a water intake head around the bottom of the pool to suck water and debris into the pool cleaner where the debris is removed from the water. The water is then returned to the pool. On the other hand, the bacteria killing system is generally a stationary device that circulates pool water through a dispersal valve containing a bacteria killing material such as chlorine or the like. The water passing through the bacteria killing system kills the bacteria that pass therethrough. The water is then returned to the pool. Thus, one system removes debris that falls into the water and requires a mobile intake head to reach all areas of the pool, while the other system kills harmful bacteria that are present in the water utilizing a stationary device that sucks water from one area of the pool. As the debris usually settles to the bottom of the pool the water containing debris does not usually enter the bacteria killing system thus avoiding the problem of clogging the bacteria killing system with debris. Both systems are necessary to maintain the water in a spa or pool in a sanitary condition; however, the systems are kept separate because the debris in the water could quickly clog the pathways through the bacteria killing material thus rendering the bacteria killing material ineffective. One device that both sanitizes and cleans is shown in the Moni U.S. Pat. No. 5,225,074 but Moni does not draw water for cleaning and for sanitizing from the same source.

In contrast to the prior art pool cleaning devices that only remove debris, or the bacteria killing systems that only kill bacteria, the present invention provides a pool cleaning device that not only cleans the pool of debris but simultaneously purifies water in a portion of the uncleaned water passing through the pool cleaning device by separating the stream of water passing therethrough into two streams. A first stream that carries the heavier debris that normally settles out of the water through the housing and a second stream that is substantially free of debris that is directed through a water purification material to thereby simultaneously purify the water and remove debris from water drawn from various locations in the pool.

The present invention has been found particularly useful in addressing the problem of inadequate water circulation through an off-site water purification systems such as a bacteria killing system. That is, because of the geometric configuration of certain pools, the pool may contain "dead spots" where water in the pool does not circulate through the bacteria killing system. Consequently, there may be pockets of pool water with higher bacteria concentrations than other parts of the pool simply because the water from one or more portions of the pool does not circulate through the bacteria killing system. Unfortunately, the presence or location of these dead regions are not easy to detect. The present invention addresses the problem of inadequate water circulation in dead pockets of water by providing a pool cleaner with an off-line bacteria killing system that kills bacteria in a portion of the water passing through the pool cleaning apparatus. With the present invention, which is generally moved throughout the bottom of the pool, the intake head comes into contact with the regions of the pool that contain dead pockets of water that would not normally circulate through an inline dispersal valve. The pool cleaning apparatus not only removes debris but it also draws water from the dead pockets with a portion of the water from the dead pockets being sent through the pool cleaner off-line bacteria killing canister to kill bacteria therein. The remaining portion of the water carrying the debris is sent to a collector where the debris is removed from the water. Consequently, the use of the pool cleaner of the present invention simultaneously allows one to remove debris and to purify water by bringing water from different parts of the pool into contact with the bacteria killing chemicals or minerals thus minimizing dead spots where bacteria might grow.

If the water contains a large amount of debris, the embodiment shown in FIGS. 4 and FIG. 5 is particularly well suited to both clean and sanitize the pool as the debris can flow unimpeded through housing for the off-line water purification receptacle until it is collected in the off-site filter.

DESCRIPTION OF THE PRIOR ART

U.S. Pat. No. 3,132,364 discloses a debris cleaner having a collector located at the intake of the cleaner.

U.S. Pat. No. 3,481,470 discloses a combined skimmer and filter for a swimming pool.

U.S. Pat. No. 3,755,843 discloses a pool vacuum system for cleaning a pool.

U.S. Pat. No. 3,794,052 discloses a pool cleaning apparatus to direct water into remote portions of the pool.

U.S. Pat. No. 3,947,362 discloses a liquid filter using an open cell elastomer foam body.

U.S. Pat. No. 3,957,634 discloses a filter for an aquarium.

U.S. Pat. No. 4,092,245 discloses a system for purifying a body of water such as a swimming pool.

U.S. Pat. No. 4,127,485 discloses a vacuum filter for swimming pools.

U.S. Pat. No. 4,188,295 discloses a chlorinator and filter for treating water during the initial filling of a pool.

U.S. Pat. No. 4,265,751 discloses an external aquarium filter.

U.S. Pat. No. 4,290,883 discloses a device for separating two components in a body of fluid.

U.S. Pat. No. 4,574,048 discloses a vacuum filter system using replaceable cartridges.

U.S. Pat. No. 4,610,783 discloses an attachment for a swimming pool to direct water therethrough to kill algae.

U.S. Pat. No. 4,642,833 discloses a valve assembly that results in a pulsating flow in a swimming pool cleaner.

U.S. Pat. No. 4,766,931 discloses a valve for periodically opening and closing a flow path.

U.S. Pat. No. 4,950,393 discloses a pool cleaning apparatus using sweep hoses to place small particles in suspension.

U.S. Pat. No. 4,986,906 discloses a water purification system using a cathode and anode.

U.S. Pat. No. 5,100,541 discloses an inline debris trap.

U.S. Pat. No. 5,105,496 discloses a suction cleaning device for cleaning a pool.

U.S. Pat. No. 5,135,579 discloses a method and apparatus for removing sediment from a pool that directs jets of water through the pool.

U.S. Pat. No. 5,238,585 discloses a debris cleaning apparatus for a spa.

U.S. Pat. No. 5,338,446 discloses a pool cleaning unit having a cartridge for flow of water there through.

U.S. Pat. No. 5,474,673 discloses a top mounted aquarium filter.

U.S. Pat. No. 5,527,455 discloses a fluidized bed filter system for fish tanks.

U.S. Pat. No. 5,545,335 discloses a system for purifying and clarifying water using ultraviolet radiation.

U.S. Pat. No. 5,603,135 discloses a pool cleaner with a mast attachment.

SUMMARY OF THE INVENTION

Briefly, the present invention comprises a pool apparatus that simultaneously removes debris from the water and purifies water in a portion of the water passing through the pool apparatus with the pool apparatus having an intake head for drawing water and debris from all regions of the pool and directing the water and debris to a housing capable of directing a first stream of water with debris into an off-site pool cleaner where the debris is collected while directing a second stream of water without debris through a water purification receptacle to ensure that all areas covered by the pool cleaner receive water purification action. If the water contains large amounts of debris I provide a housing with an unimpeded path for debris to flow along the bottom of the housing until the debris is collected in an off-site collector.

BRIEF DESCRIPTION OF THE DRAWINGS

FIG. 3 is an alternate embodiment of the invention;

FIG. 4 is a cross-sectional view of an alternate embodiment of the pool cleaner and sanitizing apparatus; and FIG. 5 is an end view of the pool cleaner and sanitizing apparatus of FIG. 4.

DESCRIPTION OF THE PREFERRED EMBODIMENT

Figure 1:
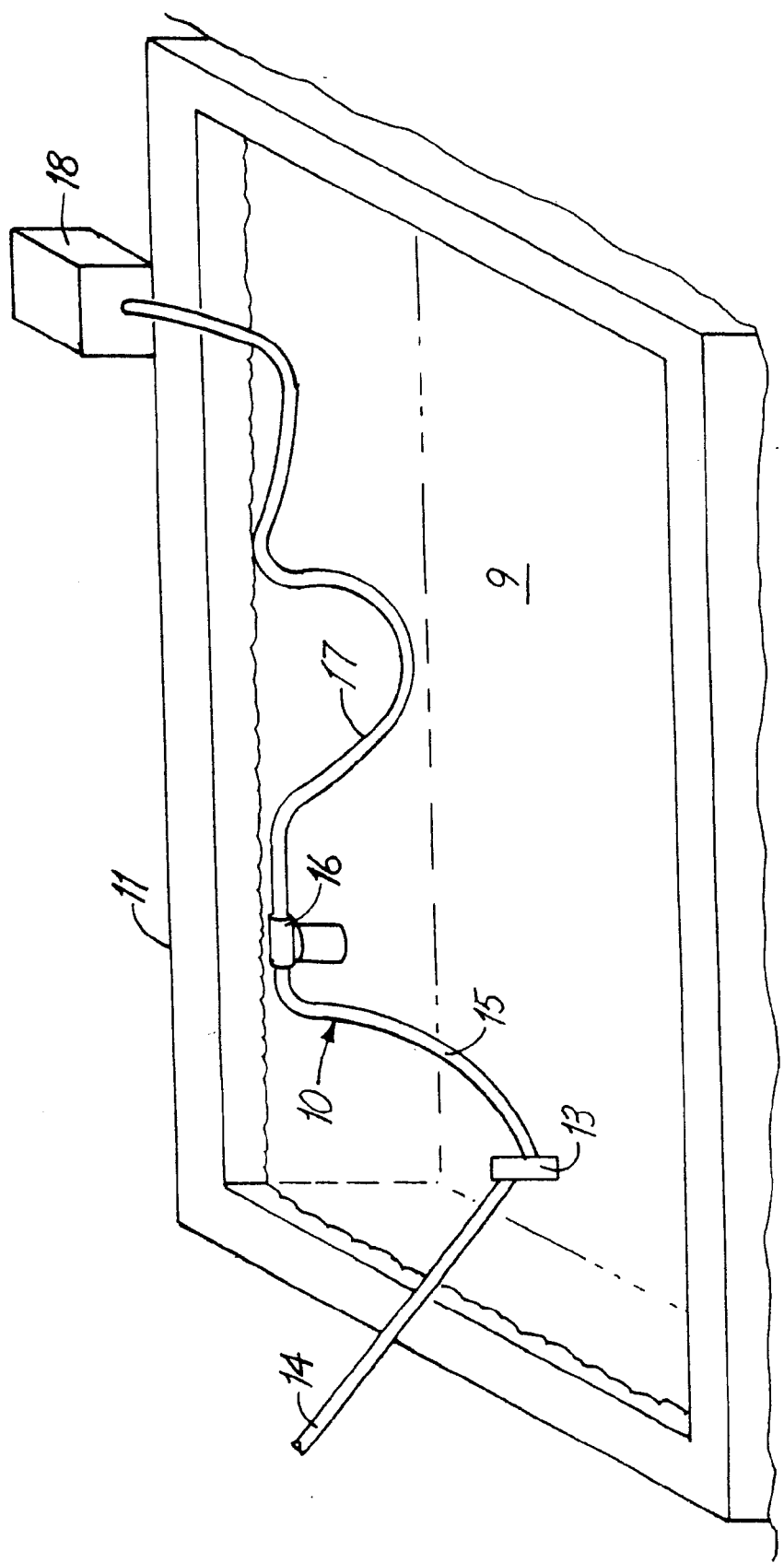
FIG. 1 is a perspective view of my pool apparatus located in a swimming pool.

FIG. 1 is a perspective view of my pool apparatus 10 located in a swimming pool 11 partially filled with water 9. Pool apparatus 10 includes an intake head 13 which has an opening therein sufficiently large to draw both water and debris therein. Intake head 13 is connected to a pole 14 to allow a person standing along the edge of pool 11 to move intake head 13 along the bottom of the pool to draw water and debris therein. Connected to intake head 13 is a flexible hose 15 that also connects to one end of a housing 16 which connects to an off-line bacteria killing apparatus or receptacle 30. Connected to the other end of housing 16 is a second flexible hose 17 that connects to a pump and collector 18 for removing debris such as leaves and the like from the water being drawing through intake head 13. Off-line bacteria killing apparatus 30 is shown floating on pool water 9 so as to keep the hoses 15 and 17 from becoming tangled. The attachment to a flexible hose provides a container holding a bacteria killing composition in the pool but in an off-line condition.

Figure 2:
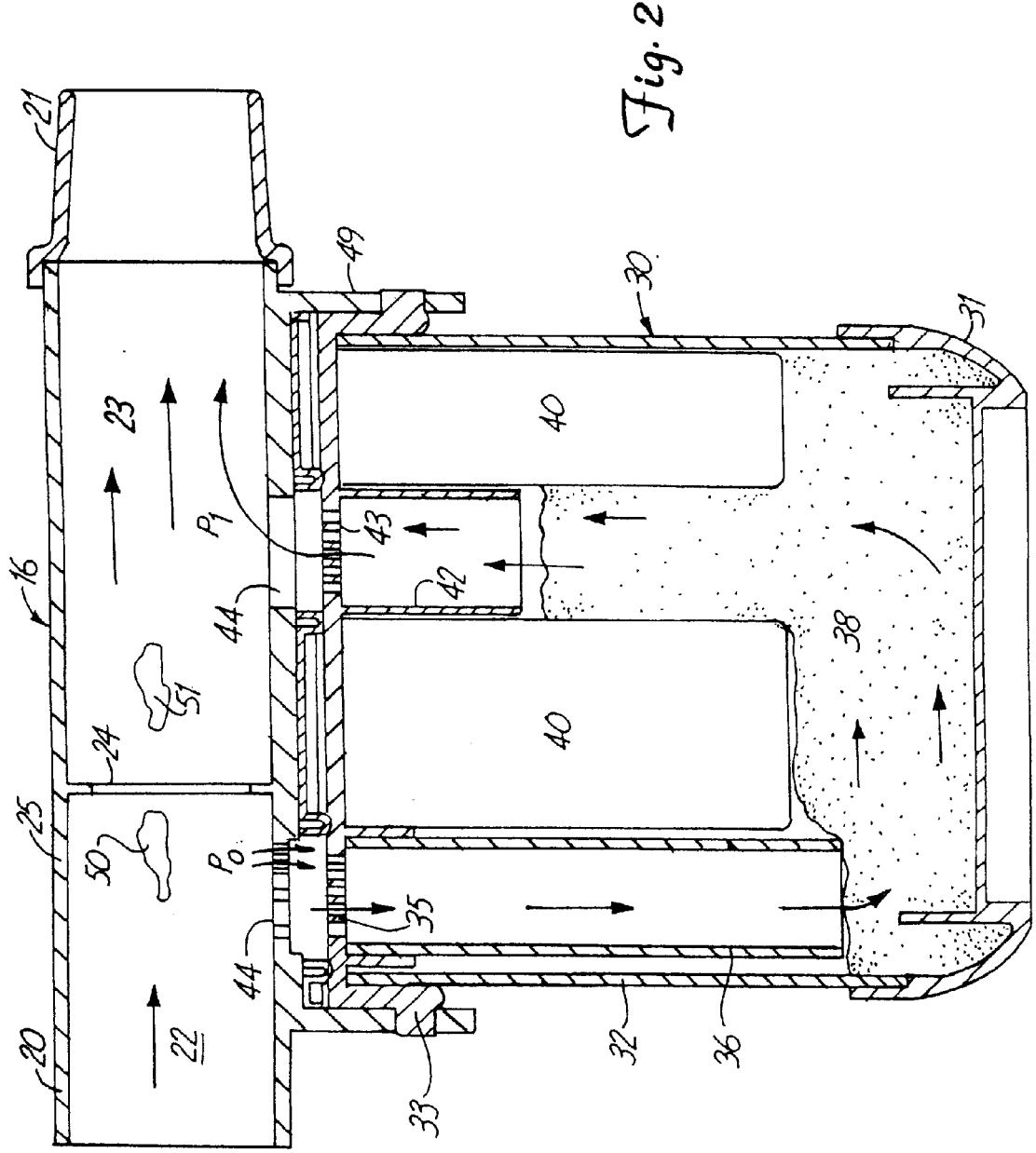
FIG. 2 is a cross-sectional view of my off-line bacteria killing system.

FIG. 2 shows a cross-sectional view of my housing 16 and off-line bacteria killing apparatus 30 having an inlet coupling 20 connected by a conduit 25 to an outlet housing or coupling 21. Located within conduit 25 is a fluid restrictor 24 in the form of a large orifice that provides some restriction to water moving directly through conduit 25. The result is that the pressure $p_o$ increases on the upstream side 22 so that a portion of the water is diverted through a bacteria killing apparatus 30 that includes a receptacle or cylindrical canister 29. Canister 29 includes a bottom section 31, an intermediate circular section 32 and an upper section or top 33 that locks into an extension 49 attached to the outside of conduit 25. Upper section or top 33 includes a first set of water inlet openings 35 and a standpipe 36 for directing water to the bottom of canister 29. Located on the bottom of canister 29 is a bacteria killing composition 38. Bacteria killing composition may take different forms and can, for example, be such material as chlorine or zinc particles having a coating of silver located on the exterior surface of the chlorine or zinc particles. In order to provide the proper buoyancy to my canister 29, foam 40 is included therein to occupy a portion of the space within canister 29.

Connected to top 33 is a second stand pipe 42 that directs sanitized water through a set of water outlet openings 43 and a main opening 44 in conduit 25.

In operation of the off-line bacteria killing canister 29, a portion of the water flows down stand pipe 36 and percolates through bacteria killing material 38 and up through passage 42 where the sanitized water is mixed with the water passing through orifice 24. At this point the portion of the water which rejoins with the stream of water passing through orifice 24 has been sanitized by the killing of the bacteria in the water as it passed through bacteria killing material 38. However, the remaining portion of the water passing through conduit 25 has not been sanitized. Thus, the off-line bacteria killing apparatus 30 provides for killing of bacteria in a portion of the water passing through conduit 25. However, the water passing through the bacteria killing apparatus 30 might be water that normally would not get cycled through the off-site bacteria killing system because of dead spots in the pool.

In operation of my system, the main portion of the fluid stream which is shown carrying debris 50 and 51 generally moves at sufficient velocity so that the debris, which is usually heavier than the water, is carried through the orifice 24 and through outlet housing 21 by the momentum of the water. After exiting housing 21 the water is directed to a collector that removes the debris from the water.

In the present invention the inlet screen 44 is located in the region where fluid is flowing past and preferably is slightly raised above the wall of the housing so that debris that should come into contact with screen 44 is washed downstream by the momentum of the water passing through orifice 24. In addition, as the debris particles are usually heavier than water it they are moving at the same speed as the water, they have greater momentum and will tend to continue to move straight through housing 21 while the water with less momentum will flow through the bacteria killing material. Thus, the large debris particles tend to be carried through orifice 24 and out of outlet housing 21, while a portion of the water passes through the bacteria killing composition 38 in canister 29. Consequently, as the pool is being cleaned of debris, a portion of the water or a stream of water that contains little or no debris is being cleansed of bacteria by passing the water through the bacteria killing composition 38.

As can be seen from the operation of the present system, the present invention address the problem of dead pockets of water by providing a mobile pool cleaner with an off-line bacteria killing system to kill bacteria in a portion of the water passing through the pool cleaner apparatus. That is, with the present invention, as the pool cleaner intake head 13 is moved around the pool into areas which may contain dead pockets, it draws water from the dead pockets with a portion of the water sent through the off line bacteria killing canister 29 to kill bacteria therein and the remaining portion carrying the debris is sent to a collector 18 that collects the debris where it can be removed from the water. Thus areas of the pool which might not receive bacteria killing action do so because the bacteria killing action is provided during the pool cleaning operation.

Referring to FIG. 3 there is shown an alternate embodiment of pool sanitizer or receptacle 60 comprising an annular inlet housing 61 having a circular inlet extension 63 for connecting directly into a pool cleaning line with annular inlet housing 61 connected to an annular outlet housing 62 having a circular outlet extensive 64 for connecting directly into a pool cleaner line. That is, the present invention can be used as an after-market device in that the sanitizer can be connected directly into the line of an existing pool cleaner to provide the pool cleaner with the ability to also sanitize at least a portion of the water passing through the pool cleaner.

Pool sanitizer 60 as shown in FIG. 3 includes a first closed annular compartment 66 that contains a flotation material such as polystyrene therein and a second closed annular compartment 67 that contains a second flotation material 69 therein. Centrally located within pool sanitizer 60 is a third annular compartment 70 that contains bacteria killing material 77 therein. Located within the center is a circular conduit 73 with a circular restrictor 71 which comprises a reduced cross-sectional flow area. Located upstream of restrictor 71 is a set of openings 74 that are circumferentially spaced around conduit 73. Similarly, located downstream of restrictor 71 is a second set of openings 76 that are circumferentially spaced around conduit. The first set of openings 74 provide an outlet for water to pass therethrough and into the bacteria killing material 77 in compartment 70 while the second set of openings 76 provide an inlet for the water to return to the conduit 73.

In operation of the pool sanitizer of FIG. 3, the water enters inlet housing 63. The restriction 71 produces a venturi like effect that directs water radially outward through openings 74. However, since the water moving through the center of the restrictor moves faster than the water in the larger portion of the content it has been found that the debris in the water is generally carried through the pool sanitizer 60 while a portion of the water contains little or no debris flows along the peripheral region of the pool sanitizer and is diverted though the bacteria killing material 77. Consequently, the increased velocity of the water as it passes through restriction 71 in conduit 73 pulls the debris though the central portion of the conduit stream so that the water removed from the peripheral region of the conduit contains less debris and can be circulated through the bacteria killing material without prematurely plugging the pathways through the bacteria killing material.

It will be appreciated that with the present invention one can simultaneously clean the pool of debris and kill bacteria in the pool thus providing a more effective bacteria killing operation. The present invention is particularly useful in areas where dead spots and debris are a problem as it ensures that the pool water will be cleaned and at the same time bacteria levels in the pool will be held down by the circulation of a portion of the water from dead pockets through the bacteria killing system. It should be also pointed out that debris has a tendency to settle into the dead spots in the pool as there is less circulation in the dead spots to disperse the debris around the pool. Thus the present invention of a pool cleaner to remove debris generally targets areas of the pool where it is most likely that the water has not received sufficient bacteria killing action.

It will be envisioned that the present invention can be used to enhance or boost the sanitizing of the water and can easily be adapted to an existing pool cleaning system by cutting the suction hose and attaching the housing and canister thereto. In addition, although the pool cleaning system is shown on the suction side it could also be used on the pressure side if desired.

Thus the present invention provides an after-market pool sanitizer for converting a pool cleaner into a pool apparatus that simultaneously removes debris from the water and kills bacteria in a portion of the water passing through the pool apparatus. The after-market pool sanitizer includes a housing having an inlet member for connection to an inlet hose of a pool cleaner with the housing having a conduit therein with a fluid restrictor therein for directing a portion of the water laterally of said conduit while allowing the water containing debris to flow straight through the conduit. The water that is directed laterally is directed into a compartment in the housing which holds the bacteria killing composition in a lateral off-line condition so that the restrictor can direct a portion of the water with less debris through the bacteria killing composition while the remaining portion with the debris therein is directed to a collector where the debris is collected and removed therefrom to thereby provide for simultaneously sanitizing and cleaning of the water drawn through the housing.

FIG. 4 shows an alternate embodiment of a pool cleaner and sanitizing apparatus 80 for use in pools that contain large amounts of debris in order to minimize the chances of having debris clog the water purification material. That is, in certain applications such as outdoor pools, the pool may contain significant amounts of wind blown debris. The embodiment of FIG. 4 is intended to allow the heavy debris to flow substantially unimpeded through the pool cleaner and sanitizing apparatus 80 to thereby minimize the contamination of the water purification material 81 located therein. An example of a typical water purification material 81 to be used in the off-line water purification receptacle 90 comprises a composition of silver chloride, limestone and zinc metal. A suitable water purification material is shown in my copending U.S. patent application titled Water Treatment Composition filed Oct. 24, 1997.

Pool cleaner and sanitizing apparatus 80 includes a housing 82 having a cylindrical passage 89 with a top 98 and a bottom 97. Housing 82 has an inlet member 82a for engagement with one end of flexible hose that connects to the intake head and an outlet member 82b for engagement with another flexible hose that goes to the off-site debris collector. A diverter comprising a radial obstruction 83 that projects along a portion of the interior of cylindrical passage 89 with the bottom of the obstruction 83 spaced a distance "x" from the bottom 97 of housing 82. The distance "x" is determined based on the size of the passage and the fluid flow conditions through the passage 89. For example, in a two-inch diameter passage , a typical dimension for "x" can be ¼ inch. Those in the art will readily recognize that one must make diverter of sufficient size so as to create sufficient back pressure so that a portion of the stream of water flowing (indicated by arrows) through cylindrical passage 89 in housing 82 flows into a lateral opening 84. Lateral opening 84 is located upstream of obstruction 83 and is spaced a distance "y" above the bottom of the cylindrical housing 89. Lateral opening 84 forms a santizer fluid intake passage that directs a portion of the water in passage 89 into conduit 91. Lateral opening 84 is spaced sufficiently above the bottom 97 so as to minimize entraining the debris flowing along a lower portion 95a of cylindrical passage 89 from entering opening 84. Similarly, Located downstream of obstruction 83 is a lateral opening 85 that is spaced a distance "$y_1$" above the bottom of the cylindrical housing 83. Lateral opening 85 forms a santizer fluid return passage and is spaced sufficiently upward from bottom 97 so as to prevent debris flowing thought housing 82 from accidentally being caught thereon.

FIG. 5 shows an end view of the pool cleaner and sanitizing apparatus 80 of FIG. 4 with cylindrical housing 82 secured to cap 91 which is engageable and disengageable to an off-line water purification receptacle 90 through means not shown. A vertical axis 96 extends upward and intersects housing 82 at housing bottom 97 and at housing top 98. The obstruction 83 is shown as a radial protrusion that extends internally around the topmost portion of the circumference of the cylindrical housing 82 to create an upper flow region 95b in the upper portion of the housing 82, which is located above dotted line 95 and a lower flow region 95a in the lower portion of housing 82, which is located below dotted line 95. Thus, upper flow region 95b has a peripheral obstruction while lower flow region 95a, which is located below dotted line 95, does not have any peripheral obstruction. As the lower flow region 95a is unimpeded, heavier debris contained in the water can flow unimpeded along the lower flow region 95a on the bottom portion of the housing and be carried to the off-site filter mechanism. This is particularly useful with debris that is heavier than water such as sand.

In the embodiment shown the cylindrical housing 80 includes a first intake 84 and a second identical intake spaced across therefrom (not shown) which directs a portion of the water into conduit 91 into the off-line water purification receptacle 90. Similarly the cylindrical housing includes a first fluid return port 85 and a second identical fluid return port spaced laterally across therefrom (not shown) that returns the sanitized water to the passage 89.

FIG. 5 shows a first housing 85a that contains a fluid passage therein that connects to opening 85 and to the conduit 92 and a second housing 85b that contains a passage that connects to the lateral opening opposite of opening 85 and to the inlet fluid passage 91 in sanitizer 90.

In operation, of apparatus 80 the housing 82 has an off-line water purification receptacle 90 attached thereto. The housing has an inlet member 82a for engagement with one end of a flexible hose and an outlet member 82b for directing water with debris which normally settles out of water through the housing 82. The housing 82 has a diverter 83 therein for obstructing an upper portion of the housing 95b to form an upper flow region 95b. The housing 82 has a bottom 97 proximate a lower portion of the housing with the lower portion of housing 82 free of obstruction to thereby form a lower flow region 95a that allows debris that normally settles out of water to flow unimpeded along the bottom of the housing. The diverter 83 is positioned downstream of a fluid intake 84 to the water purification receptacle 90 so as to increase the pressure in the upper flow region 95b and thereby divide the single stream of water and debris into a first stream and a second stream. The first steam flows into the fluid intake 84 located above the bottom 97 of housing 82 so that said first stream captures little if any debris. The fluid intake 84 then directs the first stream through a bed of water purification materials 81 while the debris in the second stream flows unimpeded through the lower portion 95a of the housing 82 to thereby provide for separate water purification of portion of a single stream while minimizing the contamination of the water purification materials.

In order to maintain the unimpeded flow region 95a on the lowermost portion of the housing 82, the buoyant material and the water purification composition is such that there is sufficient top buoyancy to float the apparatus in an upright position as shown in FIG. 5.

FIG. 5 shows the center of gravity "cg" of the sanitizer spaced a distance "s" from the bottom of the santizer, which is lower than the geometric center "gc" of the sanitizer thereby ensuring that the santizer will float in the upright position as shown in FIG. 5.

When pool cleaner and sanitizing apparatus 80 floats in the upright position as shown in FIG. 5, the flow passage located below dotted line 95 remains as the lowermost flow portion of the cylindrical housing 82. Consequently, heavy dirt and debris which would settle out of the water can be carried along the bottom flow passage without encountering any obstructions, while at the same time the intake flow and return flow from the sanitizer contains little if any debris. By placing the floatation material 93 in the top portion of off-line water purification receptacle 90 and heavier bacteria killing material in the bottom portion one can creates a santizer where the center of gravity of the off-line water purification receptacle 90 is lower than the geometric center of the off-line water purification receptacle 90 thereby ensuring that the off-line water purification receptacle 90 floats in an upright condition as shown in FIG. 5. In this condition gravity can maintain debris in the lower flow region so that the debris can be carried unimpeded through the housing.

I claim:

1. A mobile pool cleaning apparatus for moving along the underwater surfaces of a pool comprising;

an intake head, said intake head having an opening therein sufficiently large to draw a single stream of both water and debris therein;

a flexible hose, said flexible hose having a first end connected to said intake head and a second end, said flexible hose having sufficiently large diameter so as to allow the single stream of both water and debris to pass therethrough;

a housing having an off-line water purification receptacle, said housing having an inlet member for engagement with said second end of said flexible hose and an outlet member for directing water with debris which normally settles out of water therethrough, said housing having a diverter therein for obstructing an upper portion of the housing to form an upper flow region, said housing having a bottom proximate a lower portion of the housing with said lower portion of said housing free of obstruction to thereby form a lower flow region that allows debris that normally settles out of water to flow unimpeded along the bottom of the housing, said diverter positioned downstream of a fluid intake to said water purification receptacle so as to increase the pressure in the upper flow region and thereby divide the single stream of water and debris into a first stream and a second stream, said first steam flowing into said fluid intake, said fluid intake located above the bottom of said housing so that said first stream captures little if any debris, said fluid intake directing the first stream through a bed of water purification material while the debris in the second stream flows unimpeded through the lower portion of the housing to thereby provide for separate water purification of portion of a single stream.

2. The mobile pool cleaning apparatus of claim 1 wherein said water purification receptacle comprises a bacteria killing receptacle that has sufficient top buoyancy to float in an upright position so that gravity can maintain the debris in the lower flow region.

3. The mobile pool cleaning apparatus of claim 2 wherein said off-line water purification receptacle includes silver chloride, limestone and zinc metal.

4. The mobile pool cleaning apparatus of claim 1 wherein said off-line water purification receptacle has a top and a bottom with a bed of bacteria killing minerals located on the bottom of the off-line water purification receptacle.

5. The mobile pool cleaning apparatus of claim 1 wherein the diverter comprises a radially inward projecting member.

6. The mobile pool cleaning apparatus of claim 1 wherein the pool cleaning apparatus has at least two fluid intakes spaced on opposite sides of said housing and at least two fluid returns each spaced on opposite sides of said housing.

7. The mobile pool cleaning apparatus of claim 1 wherein the debris collector is located outside the pool.

8. The mobile pool cleaning apparatus of claim 1 including a fluid return located downstream of said diverter for returning said second stream to the first stream flowing though said housing.

9. The method of simultaneously cleaning and sanitizing a pool by:

drawing water containing debris and bacteria from different areas of the pool through an intake head;

placing a bacteria killing composition in the bottom of a buoyant off-line water purification receptacle to cause the off-line water purification receptacle float in an upright condition; and directing a portion of the water in a lower flow region at sufficient speed so as to carry the debris along a bottom of a housing free of flow impediments and into a debris collector to thereby remove debris therefrom while at the same time impeding the flow of water in an upper flow region to direct a further portion of the water in the upper flow region through an off-line water purification receptacle so that the further portion of the water drawn through the intake head can be subject to water purification action.

10. The method of claim 9 including the step of restricting the water flow by placing a radial projecting member in the upper flow region so as to increase the pressure upstream of the radially projecting member to thereby direct a portion of the water through the bacteria killing composition in the off-line water purification receptacle.

11. An after-market pool sanitizer for converting a pool cleaner into a pool apparatus that simultaneously removes debris from the water and purifies water in a portion of the water passing through the pool apparatus with the after-market pool sanitizer comprising:

a housing having an inlet member for connection to hose of a pool cleaner, said housing having an off-line water purification receptacle, said housing having an outlet member for engagement with an outlet hose and a passage way for directing water with debris which normally settles out of water therethrough, said housing having a diverter therein for obstructing an upper portion of the housing to form an upper flow region, said housing having a bottom proximate a lower portion of the housing with said lower portion of said housing free of obstruction to thereby form a lower flow region that allows debris that normally settles out of water to flow unimpeded along the bottom of the housing, said diverter positioned downstream of a fluid intake to said water purification receptacle so as to increase the pressure in the upper flow region and thereby divide the single stream of water and debris into a first stream and a second stream, said first steam flowing into said fluid intake, said fluid intake located above the bottom of said housing so that said first stream captures little if any debris, said fluid intake directing the first stream through a bed of water purification material while the debris in the second stream flows unimpeded through the lower portion of the housing to thereby provide for separate water purification of portion of a single stream.

12. The pool apparatus of claim 11, wherein the water purification material comprises silver chloride, limestone and zinc metal.

13. The method of simultaneously cleaning and sanitizing a pool by:

drawing water from the pool;

placing a bacteria killing composition in a water purification receptacle;

directing a portion of the water along an unimpeded path in the water purification receptacle at sufficient speed so as to carry debris therethrough while at the same time impeding a further portion of the flow of water in the water purification receptacle to direct the further portion of the water into the bacteria killing composition in the water purification receptacle so that the further portion of the water can be subject to water purification action.

* * * * *